(No Model.)

W. A. FORCE & W. W. SAWYER.
CONSECUTIVE NUMBERING MACHINE.

No. 412,489. Patented Oct. 8, 1889.

WITNESSES:
Gustave Dieterich
T. F. Bourne

INVENTORS.
William A. Force
Willard W. Sawyer
BY
Briesen, Steele & Knauth
ATTORNEYS.

UNITED STATES PATENT OFFICE.

WILLIAM A. FORCE AND WILLARD W. SAWYER, OF BROOKLYN, NEW YORK.

CONSECUTIVE-NUMBERING MACHINE.

SPECIFICATION forming part of Letters Patent No. 412,489, dated October 8, 1889.

Application filed December 21, 1888. Serial No. 294,293. (No model.)

*To all whom it may concern:*

Be it known that we, WILLIAM A. FORCE and WILLARD W. SAWYER, both residents of the city of Brooklyn, State of New York, have invented an Improved Consecutive-Numbering Machine, of which the following is a specification.

The object of our invention is to provide an improved consecutive-numbering machine that will be simple in construction, easy of manipulation, and effective in use.

The invention consists in the details of improvement and the combinations of parts, that will be more fully hereinafter set forth.

Reference is to be had to the accompanying drawings, forming part of this specification, in which—

Figure 1:
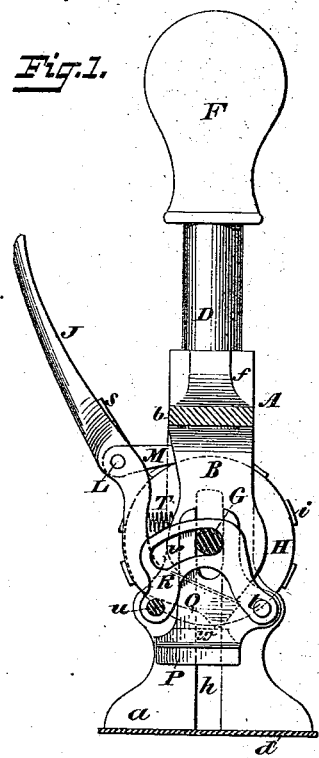
Figure 2:
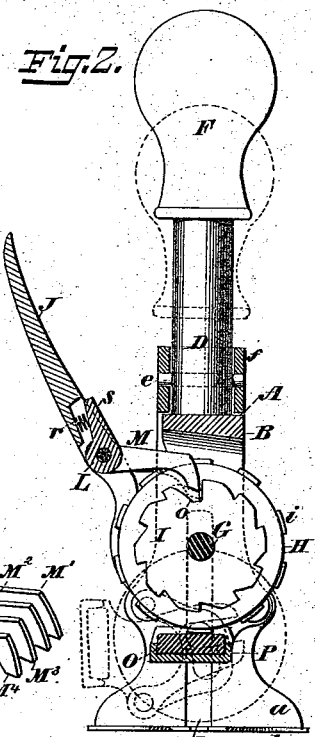
Figure 5:
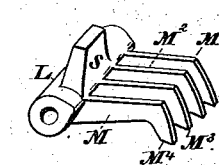
Figure 3:
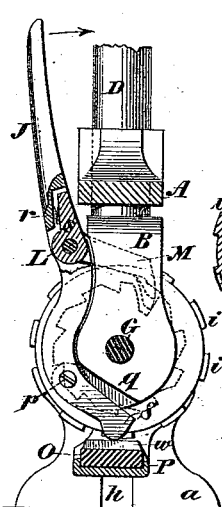
Figure 4:
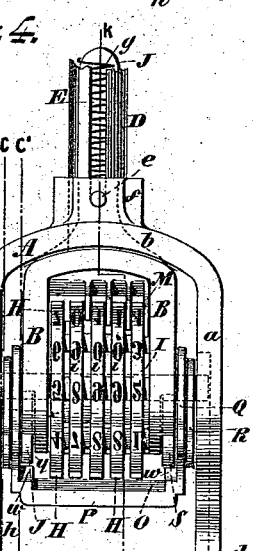
Figure 6:
Figure 7:
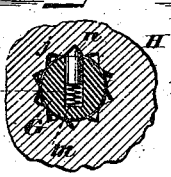

Figure 1 is a vertical cross-section on the plane of the line $c\,c$, Fig. 4, of a consecutive-numbering machine constructed according to our invention. Fig. 2 is a similar view on the plane of the line $k\,k$, Fig. 4. Fig. 3 is a similar view on the plane of the line $c'\,c'$, Fig. 4. Fig. 4 is a face view, partly broken, of the lower portion of our improved consecutive-numbering machine. Fig. 5 is a detail perspective view of the dog for turning the number-disks. Fig. 6 is a cross-sectional detail view through one of the number-disks and its supporting-shaft, showing the manner of holding the disk in position on the shaft; and Fig. 7 is an enlarged detail view of the parts shown in Fig. 6.

In the accompanying drawings, the letter A represents the main frame of our improved consecutive-numbering machine, which consists of two uprights $a$, connected by a yoke $b$, as shown clearly in Fig. 4. The lower or free ends of the uprights $a$ on the frame A are preferably connected by an apertured plate $d$, which serves to strengthen the frame and to permit the passage of the types through the plate, while preventing other types than the desired ones striking the article to be printed upon, as hereinafter shown.

Within the frame A is a frame B, that is substantially similar in shape to the frame A, as clearly shown in Fig. 4. The frame B is connected with a vertical rod or spindle D, that passes freely through an opening or neck $f$ in the yoke $b$ of the frame A, as shown, permitting the frame B to be reciprocated. The normal position of the frame B is at the upper part of the frame A, as shown in Fig. 4, and it may be held in said position by any suitable means, preferably by a spring E. (See Fig. 4.) For this purpose we construct the rod D with a central longitudinal cavity, into which the spring E is placed, one end of said spring resting against a pin $e$, that passes through the neck $f$ on the yoke $b$ and through slots $g$ on opposite sides of the rod D, whereby the rod D is also prevented from turning. The opposite end of the spring E bears against the handle F on the rod D or on any other abutment secured to or formed in said rod.

G is a horizontal shaft that passes through the frame B, its ends projecting from the sides of the said frame, as shown in Fig. 4. The ends of the shaft G enter and are guided in vertical grooves $h$ on the inner sides of the legs $a$ of the frame A, as shown in Figs. 2 and 4. By this means the frame B is permitted vertically-reciprocating motion, but is prevented from turning in the frame A. As this turning is prevented by the pin $e$ in the slots $g$, and also by the shaft G in the grooves $h$, either of said devices may be omitted so long as the other is used.

H are disks that are hung on the shaft G within the frame B, as shown. In Fig. 4 are shown five such disks on the shaft G, but this number may be varied to suit the requirements. The disks H are provided on their peripheries with types $i$, which are cut in the form of numerals, each disk being provided with type-figures in the digits from one to nine and the cipher 0.

The disks H are free to rotate on the shaft G; but, in order to prevent their spontaneous rotation, we provide them at the central aperture through which the shaft G passes with a number of notches $j$, there being one such notch for each type on the periphery of the disk.

$l$ is a recess in the shaft G, there being one such recess in said shaft in line with each disk H. In the bottom of the recesses $l$ we place a spring $m$, and upon said spring a pin or stud $n$, the outer end of which stud is preferably tapered, as in Fig. 7. This pin or stud $n$ will be pressed by the spring $m$ into a notch $j$ on the disk H, as shown in Figs. 6 and 7, whereby the disks H will be prevented from spontaneous rotation; but the disks may be rotated on the shaft G by hand or otherwise, because the tapered end of the stud will permit the disk to ride over it, said stud being pressed into the recess $l$ as the disk is rotated, and being pressed outward into the next notch $j$ when said notch comes in line with the stud.

In order to rotate the several disks in consecutive order, so as to produce the consecutive numbering, we provide each disk H with a ratchet-face I, that is secured to and rotates in unison with the disk H, as shown in Fig. 2. The ratchet-faces I are each provided with a number of ratchets or teeth corresponding to the number of types on the disks H. Between two of the ratchet-teeth on the faces I is a recess $o$, that is cut deeper than the recesses between the other teeth, as shown in Fig. 2. The recesses $o$ on the ratchets I are all in such a position with relation to the types on the disks that when the ciphers 0 or other desired figures on the disks are aligned the recesses $o$ in the ratchet-faces I will also be aligned.

J is a lever carried by the frame B for turning the disks H. The lever J is forked at its lower part, the forked ends of said lever being pivoted to the lower part of the frame B at $p$, said ends of said lever being by preference set into recesses $q$ on the outer sides of the frame B, so that the lever will be flush on its outer sides with the outer sides of the frame B.

L is a bar or tube journaled at its ends in the upper forked part of the lever J, as shown in Figs. 2 and 3. The bar or tube L carries (see Fig. 5) a number of dogs M, that are adapted to engage the ratchet-faces I, carried by the disks H, as in Fig. 2. The dogs M are held in operative position with relation to the ratchet-faces I by means of a spring $r$, which presses at one end against a lug $s$ on the bar or tube L, and at its opposite end against the lever J, as in Fig. 2; but said dogs may be held in proper position by any other suitable means. The outer or actuating ends of the dogs M are, as shown in Figs. 2, 3, 4, and 5, on different levels; or, in other words, the end of one dog is lower than the end of the next adjoining dog, and so on through the series. This construction is for the purpose of turning one disk H at a time until it has made one complete revolution, when it and the adjoining disk will be turned the distance of one tooth and the second disk will afterward stand still while the first disk is being revolved completely around until it has made one revolution again, when the second disk will be moved another tooth, and so on from disk to disk. This turning of the disks will be understood by the following: Suppose all the ciphers 0, for instance, to be in line. This will bring all the recesses $o$ in the ratchet-faces I in line, so that all the dogs M may pass into said recesses. The lever J is now moved in the direction of the arrow in Fig. 3, whereby all the dogs will move their respective ratchet-faces and turn the disks H the distance of one tooth. The ciphers are now still in line on the several disks, and also in line with the aperture in the bottom plate $d$. When the lever J now recedes to the position shown in Fig. 2, the outer end of the lowest dog M—the one for the unit-disk—will ride upon its ratchet-face I, and as the other dogs M are not so low they will be raised slightly from their respective ratchet-faces I, and will not act upon the same at the next stroke of the lever J. The lever J is now moved in the direction of the arrow to rotate the unit-disk H, and so on until said unit-disk has made a complete revolution. By this means the recess $o$ in the units-disk ratchet I will have come under the lowest dog M', whereby said dog will be permitted to drop slightly, which brings the next dog $M^2$ against its ratchet-face I. As the lever J is now moved, the dogs M' $M^2$ will both move their respective ratchets the distance of one tooth, which will bring the numeral 1 on the second or "tens" disk into printing position. This second disk will now stay in this position until the units-disk has been rotated around again and its recess $o$ comes again in line with the dog M', when said dog will again drop, thereby permitting the dog $M^2$ to again contact the ratchet on the second disk and move the disk the distance of one tooth. This successive complete revolution of the "units-disk" and the movement of the tens-disk the distance of one tooth for each such revolution will be kept up until the units-disk has been turned ten times and the tens-disk has been turned one complete revolution, when the recesses $o$ in said two disks will be aligned, and thus permit the dogs M' $M^2$ to descend, so as to bring the dog $M^3$ in contact with its corresponding ratchet-face on the "hundreds-disk." Each time the tens-disk now makes a complete revolution the hundreds-disk will be moved the distance of one tooth, so that when the tens-disk has made ten revolutions the hundreds-disk will have made one revolution, by this time the recesses $o$ in said three disks being aligned beneath the dogs. This will permit the dogs to drop a little lower than before, and bring the dog $M^4$ in contact with its ratchet-face I on the "thousands-disk." Each time the hundreds-disk makes a comple revolution the thousands-disk will be moved by its dog the distance of one tooth, so that when the hundreds-disk has been turned ten times the thousands-disk will have been turned once around, so as to bring the respective recesses $o$ in the several disks in line again. This turning of the disks will be commuicated from one to the other throughout as many disks as there may be on the shaft G. It will be understood that each time the lever J is rocked the units-disk will be turned the distance of a tooth whether turned singly or whether the tens, hundreds, thousands, &c., disks are all turned at once. By this means the consecutive numbering, or, in other words, the consecutive changing of the figures is accomplished.

Each time the lever J moves to turn a disk and to bring another figure in line, the frame B is to be depressed to produce the desired imprint.

As our machine is a "self-inking" machine, we provide for this purpose the following devices: O is an inking-pad that is adapted to contact the types to ink them. This pad is carried by a yoke P, whose arms Q are adapted to straddle the frame B at the lower part thereof. Each of these arms is forked, as shown in Fig. 1, and adapted to straddle the shaft G, as in said figure, and thereby to be guided by said shaft. In order to move the inking-pad O from contact with the type from the position shown in Fig. 1 into that shown by dotted lines in Fig. 2, we pivot to each arm Q, at $t$, one end of a plate R, the other end of which is pivoted to the arms $a$ of the frame A, at $u$, directly opposite the pivot $t$, when the parts are in the normal position, as in Fig. 1. The plates R are provided between their pivots $t$ $u$ each with a curved slot $v$, through one end of which the ends of the shaft G extend, as clearly shown in Fig. 1. When now the frame B is depressed, the shaft G will during its descent press upon the plates R, which will thereby be swung on their pivots $u$, causing their ends $t$ to swing in the arc of a circle described around the pivots $u$. As the plates R are thus swung, they will, by means of the pivots $t$, swing the yoke P and the pad O from the position shown in Fig. 1 into that shown in Fig. 2 by dotted lines, or, in other words, will swing said pad to one side and out of line of the series of disks. The disks are now free to be pressed upon the paper or other article to produce an impression of their types. As the frame B is permitted to rise, the shaft G will slide in the slots $v$ of the plates R and swing said plates on their pivots $u$ in the reverse direction to the former motion, thereby raising the ends $t$ and bringing the pad up against the types again into the positions shown in Fig. 1. During the sliding and swinging movements of the pad O and yoke P the forked arms Q of said yoke will slide and swing on the shaft G.

In order to move the pad O out of frictional contact with the types when the lever J is actuated to turn the disks, and before the frame B is depressed to produce an imprint, we provide the following devices: The forked ends of the lever J are projected below the pivots $p$ in cam-like ends S. (See Fig. 3.) The lowest points of these cam-like ends S are preferably rounded, as in Fig. 3, and are adapted to bear on lugs $w$, carried by the yoke P, as in Figs. 3 and 4. When the frame B is in the elevated position and the lever J in the outward position, the pad O will be against the types, as shown. When the disks are to be turned by the lever J, the lever will be moved in the direction of the arrow, Fig. 3, whereby its cam-like ends S will be brought in contact with the lugs $w$, thereby depressing the pad, and by its connection with the plates R and shaft G also slightly lowering the frame B and compressing the spring E. When thus the pad is moved out of contact with the types, the type-disks are free to be turned by the further motion of the lever J. This position is shown in Fig. 3. When the lever J is next released and moved into the outward position shown in Figs. 1 and 2, the pad will by the spring E be moved against the new types to ink them. The lever J is moved and held in the outward position, or that shown in Figs. 1 and 2, by means of springs T, that bear at one end against the sides of the frame B, and at their opposite ends against the lever J, as shown in Fig. 1.

When it is desired to print with our improved consecutive-numbering machine, the numbers to be printed are first brought in line with the aperture in the lower plate $d$. The first impression is now given by depressing the frame B, which depression will swing the inking-pad to one side of the types by the movement of the shaft G against the pivoted plates R, as before described. When the next figure is to be produced, the lever J is moved in the direction of the arrow, Fig. 3, the first movement of the said lever being to move the inking-pad out of contact with the types on the disks by means of the cam-like projections S on said lever, as before stated. A continued movement of said lever will then turn one or more of the disks to bring the next figure or figures in line, as the case may be. The pad is now brought against the new types to ink them, and then, upon depressing the frame B without moving the lever J, the pad is swung entirely aside and the types are caused to print.

Having now described our invention, what we claim is—

1. The combination of the main frame A with the sliding frame B, having the shaft G, pad-yoke P, having arms Q, that straddle the frame B, and the plates R, having slots $v$, said plates being pivoted each at one end to the arms Q and at the other end to the frame A, the shaft G, passing through the slots $v$, whereby as the shaft G is depressed the pad-yoke P will be moved to one side, substantially as described.

2. The combination of the frame B, having shaft G, and the disks H, carried by said shaft, with the lever J, pivoted in the frame B, said lever having projections S, and with the pad-yoke P, having arms Q, that straddle the frame B, the projection S on the lever J being adapted to engage the pad-yoke and to push said pad-yoke from the disks H, substantially as herein shown and described.

3. The combination of the frame A, sliding frame B, and spring E, with the shaft G, type-disks H, disk-actuating lever J, inking-pad O, pad-yoke P, slotted plates R, pivots $t\ u$ of said plates, and with the projection S on lever J, as specified.

WILLIAM A. FORCE.
WILLARD W. SAWYER.

Witnesses:
HARRY M. TURK,
GUSTAV SCHNEPPÉ.